July 14, 1959  R. H. PETTIT  2,895,086
CONTROL STICK TRANSDUCER
Filed March 11, 1957  2 Sheets-Sheet 2
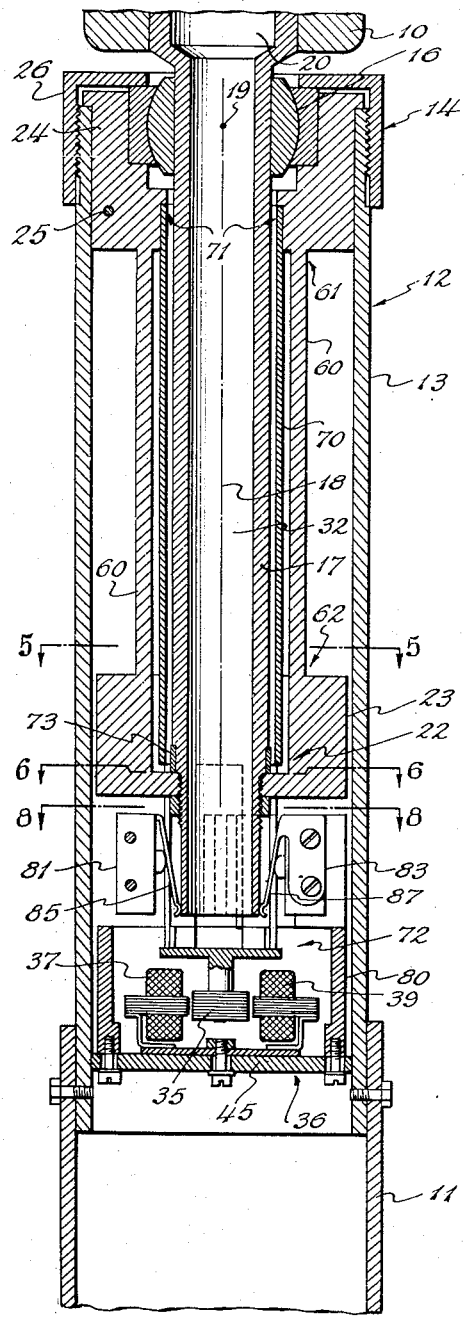
Fig. 4
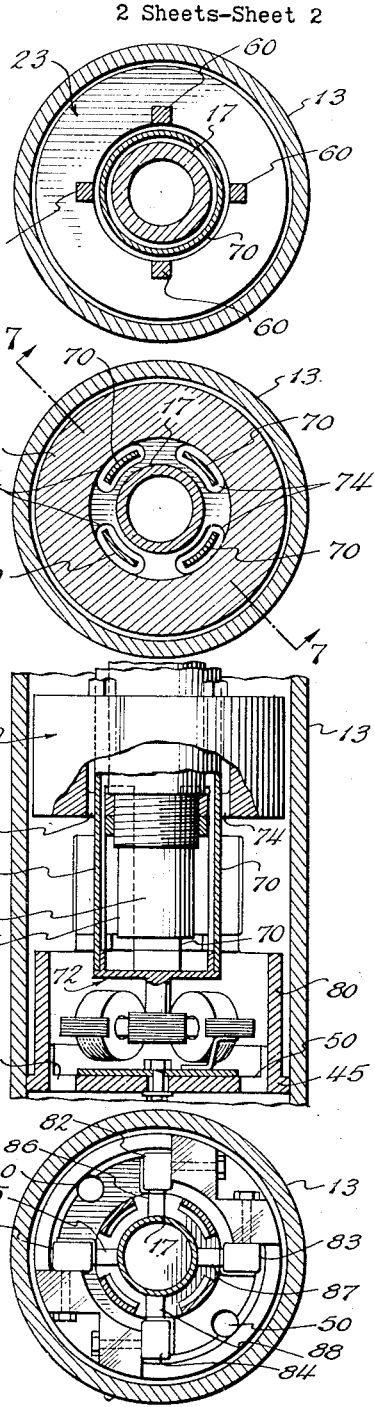
Fig. 5
Fig. 6
Fig. 7
Fig. 8
INVENTOR
ROBERT H. PETTIT
BY
ATTORNEY United States Patent Office  2,895,086
Patented July 14, 1959

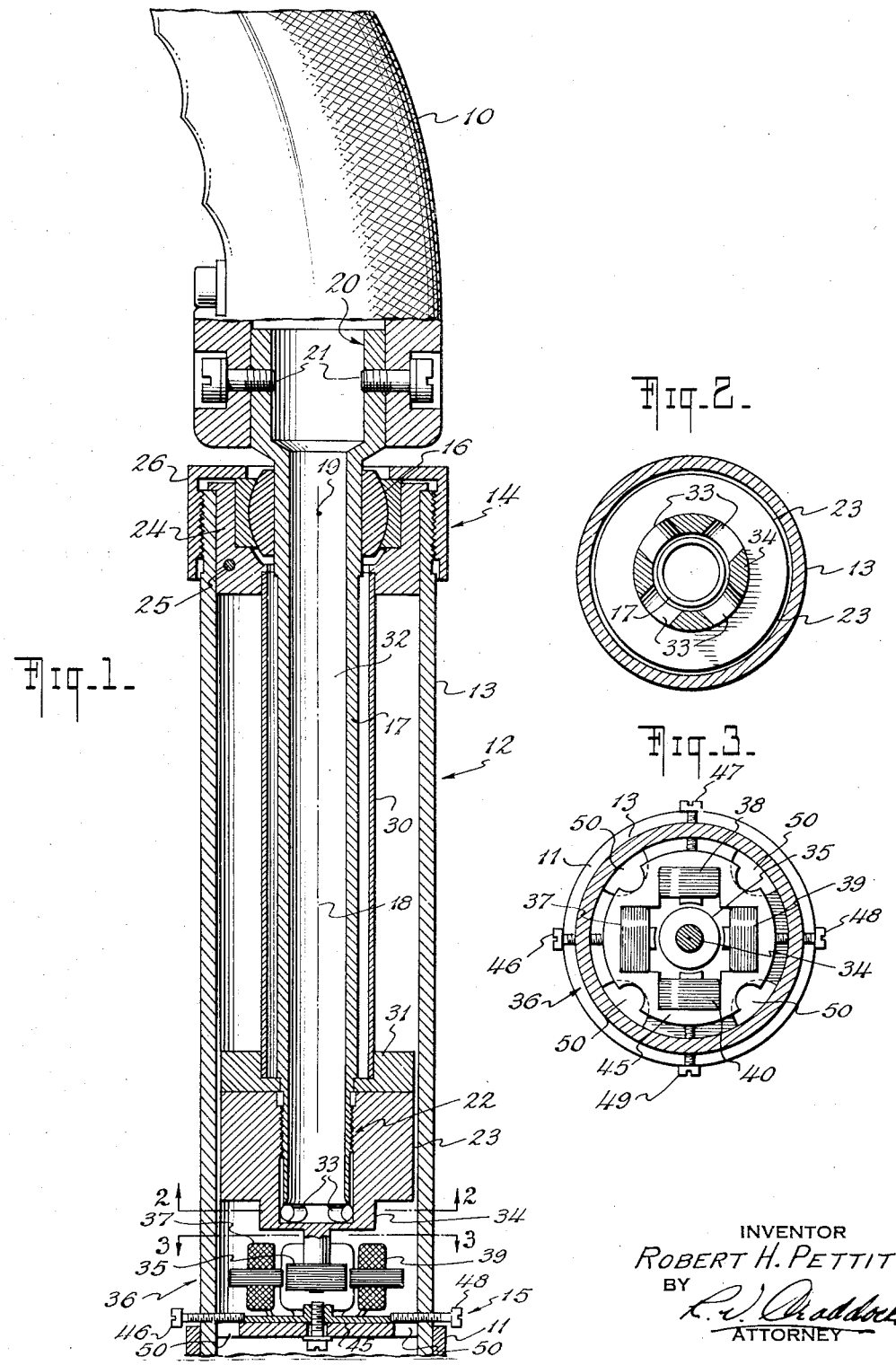

2,895,086
CONTROL STICK TRANSDUCER

Robert H. Pettit, Huntington, N.Y., assignor to Sperry Rand Corporation, Great Neck, N.Y., a corporation of Delaware Application March 11, 1957, Serial No. 645,114

14 Claims. (Cl. 317—99)

The present invention relates to automatic pilot systems for dirigible aircraft, and more particularly, to an improved flight controller for an automatic pilot whereby the craft may be controlled and maneuvered in response to the force applied to said flight controller.

The flight controller of the present invention is an improvement over that shown in Patent No. 2,408,770, issued October 8, 1946, to C. A. Frische et al., entitled Electro-Hydraulic Control System and assigned to the same assignee as the present invention.

The flight controller of the present invention is in the form of a control stick force transducer which is capable of converting pilot manual effort into signals that may be used as information for the control of an automatic pilot system. With respect to an aircraft, as the pilot applies a force in any direction perpendicular to the control stick longitudinal axis, the control stick transducer of the present invention resolves this force into its vector components along the aircraft major axes while maintaining the magnitude of the resultant vectors proportional to the applied force. In the preferred embodiment of the present invention, the deflection of a pivot member, that is attached to the manual grip member, from a null position is measured and by a suitable electrical transducer provides an electrical output signal proportional in direction and magnitude to the applied force. The present invention provides a device which has an entirely natural characteristic with which pilots are familiar thereby eliminating familarization training.

In the prior art designs, it was necessary to use large displacements of the manual grip member relative to a gimbal mounted control stick in order to overcome the affect of a plurality of springs, gears and bearings. The large relative motion introduced a new sensation to the pilots and one which required a considerable familiarization program before the pilot could maneuver the aircraft effectively. This new sensation was particularly undesirable in the case of high performance aircraft of marginal stability and helicopters necessitating continuous positioning of the flight controller to maintain a desired craft attitude which unduly fatigued the human pilot.

Accordingly, it is an object of the present invention to provide a flight controller having a control stick transducer which has an entirely natural feel to the human pilot when inserting commands thereto.

It is another object of the present invention to provide a flight controller having a control stick transducer capable of providing electrical and mechanical outputs to position the control surface of a dirigible craft.

It is a further object of the present invention to provide an improved control stick transducer consisting of a minimum of moving parts that is exceptionally rugged, economical to manufacture, and will provide one or more output signals accurately corresponding to the input thereto.

Other objects and advantages of the present invention will become apparent from the following specifications and drawings, wherein like reference characters indicate like elements in which, Fig. 1 is an elevational cross-sectional view of the control stick transducer of the present invention intermediate a manual grip member and a control stick;

Fig. 2 is a cross-sectional view of the control stick transducer of Fig. 1 taken along line 2—2;

Fig. 3 is a cross-sectional view of the control stick transducer of Fig. 1 taken along line 3—3;

Fig. 4 is an elevational cross-sectional view of an alternative embodiment of the control stick transducer of the present invention;

Fig. 5 is a cross-sectional view of the control stick transducer of Fig. 4 taken along line 5—5;

Fig. 6 is a cross-sectional view of the control stick transducer of Fig. 4 taken along line 6—6;

Fig. 7 is an elevational cross-sectional view of the control stick transducer of Fig. 6 taken along line 7—7; and Fig. 8 is a cross-sectional view of the control stick transducer of Fig. 4 taken along line 8—8.

Referring now to Fig. 1, disposed intermediate a conventional manual grip member 10 in the form of a pistol grip and a control column or stick 11, is the control stick transducer 12 of the present invention. The construction and operation of the control column 11, per se, is conventional and is similar to the control column indicated at 58 in the aforementioned Patent No. 2,408,770, with the exception that the control column 11 of the present invention is pivotally mounted to control both the elevator and the aileron control surfaces in a conventional manner, not shown. The control stick transducer 12 includes a housing 13, having a first extremity 14 and a second extremity 15; the latter extremity 15 being rigidly fastened to an extremity of the control stick 11. Mounted within the first extremity 14 of housing 13 is a spherical bearing 16 that universally supports pivot arm or member 17 about the center 19 of the bearing 16 with respect to the housing 13. The spherical bearing 16 is prevented from moving axially by means of a collar 24 that is fastened to the housing 13 by pin 25 and by the retaining ring 26 which is threaded to the housing 13 and abuts against the spherical bearing 16.

Preferably, pivot member 17 is of a relatively rugged tubular construction with the longitudinal axis thereof in its normal operating condition coaxially disposed with respect to the longitudinal axis 18 of the housing 13. The pivot member 17 is disposed to slide axially within the spherical bearing 16 over a limited range, thus eliminating any axial loading of the spherical bearing 16 which would produce friction and hysteresis. The pivot member 17 has a first extremity 20 adapted to receive the grip member 10 which may be fastened thereto by suitable fastening means such as bolts 21.

In order to neutralize the acceleration affects due to the intertia of the grip member 10 acting through the pivot member 17 about point 19, a counterweight 23 is rigidly fastened to the pivot member 17 near the second extremity 22 thereof. The counterweight 23 is rigidly fastened by suitable means, such as a threaded connection to the pivot member 17. The counterweight 23 has an outside diameter slightly less than the diameter of that portion of the interior of the housing 13 adjacent to the counterweight 23. Upon the application of a predetermined force to the grip member 10, the counterweight 23 is positioned to contact the interior of the housing 13 to provide a rigid connection between the grip member 10 and the control stick 11 in a manner to be more fully described hereinafter. The counterweight 23 has an extension 34 which projects beyond and extends around the second extremity 22 of pivot member 17 to provide a support for armature 35 of pick-off 36 which will be more fully described later. The extension 34 has apertures 33 radially disposed therein as seen in Fig. 2 that cooperate with the hollow interior of the pivot member 17 to provide a passage or conduit 32 through which the electrical leads (not shown) from the grip member 10 may pass to the control stick 11.

A resilient member 30 preferably in the form of a thin hollow tube yieldingly couples the housing 13 and the pivot member 17. In the preferred embodiment of the invention shown in Fig. 1, the resilient tubular member 30 has one extremity thereof connected to the collar 24 that in turn is connected to the housing 13 near the first extremity 14 of the housing 13. The other extremity of the resilient tubular member 30 is connected near the second extremity 22 of the pivot member 17 by collar 31 such that member 30 is coaxially disposed, in its normal operating condition, with respect to the longitudinal axis 18.

The armature 35 of pick-off 36 may be positioned in accordance with the movement of the pivot member 17 by virtue of being mounted on extension 34 of counterweight 23 or may be directly connected to the pivot member 17 at the second extremity 22 thereof. The armature 35 cooperates with the stator elements, 37, 38, 39 and 40 to form a conventional bidirectional differential transformer type pick-off 36 more clearly seen in Fig. 3. The stator assembly consisting of elements 37, 38, 39 and 40 of the pick-off 36, is coaxially mounted with respect to the longitudinal axis 18 on a support plate 45, that in turn is circumferentially connected to the interior of the housing 13. Support plate 45, on which the stator assembly 37—41 is mounted, is provided with adjusting screws 46, 47, 48 and 49, to adjust the null position of the pick-off 36, such that in the normal operating or unloaded position of the pivot member 17 there is no electrical signal output from the pick-off. Apertures 50 are also provided in the support plate 45 to allow the passage of the electrical leads therethrough so that a conduit is provided for the leads from the grip member 10 to the control stick 11.

When a force is applied to the manual grip member 10 by the human pilot, the pivot member 17 will pivot about the center 19 of spherical bearing 16 such that the second extremity 22 of the pivot arm 17 will be positioned in accordance with the magnitude and direction of the component of the force that is perpendicular to the longitudinal axis 18 thereby moving the armature 35 in accordance therewith to a new position. The displacement of the armature 35 relative to the stators 37, 38, 39 and 40 of the pick-off 36 will produce an output signal from the pick-off 36 in accordance with the magnitude and displacement of the armature 35 from its null position in a manner more fully described in the aforementioned Patent No. 2,408,770. While the force is being applied, the resilient tubular member 30 provides a yielding restraint tending to return the pivot member 17 to its neutral position. Upon the application of sufficient additional force to overcome the spring restraint of member 30, the counterweight 23 will abut against the adjacent interior portion of the housing 13 thereby preventing further travel of the pivot member 17 relative to the housing 13 while providing a direct mechanical connection between the grip member 10 and the control stick 11. While the counterweight 23 is abutting against the housing 13, the electrical pick-off 36 is providing a maximum electrical output signal to the automatic pilot system (not shown) through suitable electrical connections (not shown).

In the preferred embodiment of the control stick transducer 12 shown in Fig. 1, the distance between the exterior of the counterweight 23 and the adjacent interior portion of the housing 13 is slightly less than the distance between the adjacent portions of the armature 35 and stators 37, 38, 39 and 40. Thus, damage to the pick-off 36 and over-stressing of the resilient member 30 are prevented by utilizing the counterweight 23 as a travel stop that comes into contact with the adjacent interior portion of the housing 13 at some predetermined amount of its normal travel, about 150% for example. The additional pilot effort will be transmitted through the housing 13 which will support his maximum effort to the control stick 11.

The operation of the automatic pilot system may be so designed that the control stick 11 will follow the movement of the control surface (not shown) in which event the control stick 11 will move as a function of the electrical output signal. This result is achieved by the following sequence of events: The control surface is positioned by the automatic pilot through a conventional irreversible actuator (not shown). When pilot effort is applied to the grip member 10, motion of the control stick 11 is resisted by the control surface actuator, thus a signal is produced by the control stick transducer 12. The signal operating through the autopilot moves the actuator, the control surface and the control stick 11. If the pick-off 36 is producing a maximum output signal with the counterweight 23 abutting against the housing 13 and the pilot exerts additional force on the grip member 10, the control surface is then positioned by the combined electrical and mechanical signal that is proportional to the magnitude and direction of the applied force.

In an artificial feel system, the rigid linkage between the control stick 11 and the actuator (not shown) is broken and a mechanism which will provide force feel relative to air speed or aircraft acceleration etc. is inserted. Operation of the control stick transducer 12 will now be as before.

Usually when the pilot desires to introduce a change in the attitude of the craft, he will apply a force to the grip member 10 such that only an electrical signal is produced. The movement of the armature 35 relative to the stator elements 37, 38, 39 and 40 of the pick-off 36 required to produce an electrical signal output is of such a minute magnitude as to render the movement of the pivot member 17 and grip member 10 with respect to stick 11 imperceptible to the human pilot. In the preferred embodiment of the invention, the armature 35 is required to move approximately .025 inch from its null position to provide a maximum electrical output signal.

Referring now to Fig. 4, which depicts an alternative embodiment of the present invention, a control stick transducer 12 having like elements to that shown in Fig. 1, as evidenced by the use of like reference characters, is connected between a conventional grip member 10 and a conventional control stick 11 as before. The control stick transducer 12 of Fig. 4 has additional elements therein which may be used for two purposes; first, to provide mode control of the aircraft, and, second, to establish a threshold value above which the electrical output signal from the pick-off 36 is connected to the automatic pilot system.

Within the control stick transducer 12, a resilient member 60 has its first extremity 61 integrally connected to the collar 24 while its second extremity 62 is connected to the second extremity 22 of the pivot member 17 by virtue of being integrally connected to counterweight 23 which is threadedly fastened to the second extremity 22 of the pivot member 17. As seen more clearly in Fig. 5, the resilient member 60 may be comprised of four elongated resilient elements disposed parallel to and equally spaced around the longitudinal axis 18.

Referring again to Fig. 4, within the control stick transducer 12, a second resilient member 70, preferably of tubular construction, has a first extremity 71 connected in cantilever fashion to collar 24. The second extremity 72 of tubular resilient member 70 has attached thereto the armature member 35 of pick-off 36, which has been described previously. The periphery of the tubular member 70, near its second extremity 72, is axially slotted to provide openings through which the contact arms of the microswitches, which will be more fully described later, may project. As seen more celarly in Figs. 6 and 7, the counterweight 23 has a plurality of apertures 74 therein to allow the passage of the solid portions of the second extremity 72 of resilient member 70 therethrough. Referring again to Fig. 4, the tubular resilient member 70 preferably has an inside diameter slightly larger than the outside diameter of the pivot member 17 and is disposed coaxially therewith. The pivot member 17 has a projecting shoulder 73 around the circumference thereof which provides a predetermined clearance between the shoulder 73 and the interior of member 70. In Fig. 4, shoulder 73 is provided by an annulus fixed to and surrounding pivot member 17. The spring constant of resilient member 60 is preferably appreciably lower than the spring constant of resilient member 70, the latter being of tubular construction as previously described. The resilient member 70 is coaxially disposed with respect to pivot member 17 and adjacent thereto, while the resilient member 60 is also coaxially disposed and intermediate resilient member 70 and housing 13, preferably.

The pick-off 36 is mounted on a support plate 45 as previously described with respect to Fig. 1. Also mounted on the support plate 45 and movable therewith is cylindrical support member 80 which supports microswitches 81, 82, 83 and 84, more clearly seen in Fig. 8, that are substantially axially aligned with their respective stators 37, 38, 39 and 40 of pick-off 36. The contact arms 85, 86, 87 and 88 of the respective microswitches 81, 82, 83 and 84 project through the slots in resilient member 70 and each contact arm abuts against the second extremity 22 of pivot member 17 such as to be positioned by movement of pivot member 17. The stators 37, 38, 39 and 40 and the microswitches 81, 82, 83 and 84 are provided with suitable adjusting screws for axial and radial alignment. The normally-open microswitches 81, 82, 83 and 84 are electrically connected to their respective stator elements 37, 38, 39 and 40, in series such that upon the closing of one of the microswitches, the electrical output signal from the respective stator of the pick-off 36 is connected to the automatic pilot system (not shown).

The slots in the second extremity 72 of resilient member 70 cooperate with the hollow interior of tubular pivot member 17 and with the apertures 50 in the support plate 45 to provide a conduit for a passage of electrical leads (not shown) from the grip member 10 through the control stick transducer 12 to the control stick 11.

In the operation of the alternative embodiment of the present invention as shown in Fig. 4, when the human pilot initially applies a force to the grip member 10, the pivot member 17 pivots around point 19 thereby displacing the second extremity 22. Depending upon the direction of the applied force, one of the contact arms 85, 86, 87 or 88, which abuts against the second extremity 22, will be displaced to close the contact in the respective microswitches 81, 82, 83 or 84. Initially, the pilot is operating against the resilient force of resilient member 60 only since resilient member 70 is not abutting against shoulder 73. When the pilot applies a predetermined force, for example three pounds, to the grip member 10, such that he positions the extremity 22 of pivot member 17 a predetermined distance, for example .015 inch, one of the microswitches 81, 82, 83 or 84 will close. If the force is applied to the manual grip member 10 in a substantially intercardinal direction, two of the microswitches will be closed. When the contact in one of the microswitches 81, 82, 83 or 84 is closed, the electrical circuit through electrical leads (not shown) from the respective stators 37, 38, 39 or 40 of pick-off 36 to the automatic pilot system (not shown) is complete.

By virtue of the cantilevered design of resilient member 70, the armature 35 of pick-off 36 which is attached to member 70 will remain in the null position until the shoulder 73 of pivot member 17 abuts against member 70. The distance through which the pivot member 17 moves until shoulder 73 abuts against resilient member 70 may therefore provide a threshold dead zone below which no electrical output signal is generated in pick-off 36. An alternative arrangement for providing a threshold dead zone would be through the delayed actuation of the aforementioned microswitches.

Assuming no threshold dead zone, as the pilot applies force to the grip member 10, one of the microswitches will close as previously explained and simultaneously the armature 35 will be positioned by the motion of the pivot member 17 being transmitted through shoulder 73 to resilient member 70 thereby providing an electrical signal from the pick-off 36 to the automatic pilot system. Upon the application of additional force to the grip member 10 by the pilot, the contact arm of the microswitch continues to move and simply over-travels maintaining the electrical connection between the pick-off 36 and the automatic pilot system while the pick-off 36 provides a signal proportional to the magnitude and direction of the applied force. If sufficient force is applied by the pilot to the grip member 10, the counterweight 23 will abut against the inner portion of the housing 13 adjacent thereto providing a mechanical connection between the control stick 11 and the grip member 10 as described previously and also providing a maximum electrical output signal from pick-off 36.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In combination with a control stick for an automatic pilot system for a dirigible craft, a control stick transducer comprising a housing fastened to one extremity of said control stick, a pivot member universally mounted within said housing, a grip member fastened to a first extremity of said pivot member, a resilient member yieldingly coupling said housing and said pivot member, and a pick-off means responsive to the force applied to said grip member for supplying a signal in accordance with the direction and magnitude of said applied force whereby the motion required to produce said signal is imperceptible to the human pilot.

2. In combination with a control stick for an automatic pilot system for a dirigible craft, a control stick transducer of the character described in claim 1 in which said pick-off means is of the bidirectional differential transformer type wherein the armature of said pick-off is connected to a second extremity of said pivot member and the stator portion is fastened to said housing.

3. In combination with a control stick for an automatic pilot system for a dirigible craft, a control stick transducer of the character described in claim 1 including a counterweight fastened near the second extremity of said pivot member whereby acceleration affects due primarily to said grip member are substantially neutralized.

4. In combination, a control stick for steering a dirigible craft, an elongated pivotal member pivotally mounted on said control stick, said pivotal member having a grip on a first extremity thereof and a first pick-off element coupled to a second extremity thereof for movement therewithin, a second pick-off element adjacent to said first pick-off element and fixed to said control stick, said pick-off elements being arranged to produce signals indicative of the relative positions of said pick-off elements, and resilient means urging said pivotal member to a predetermined position in which said pick-off elements produce a null signal wherein the pick-off elements fixed to said stick and the pick-off elements fixed to said pivotal member are arranged to come in contact after a predetermined relative movement of said stick and member to limit said movement.

5. Apparatus of the character as described in claim 4 in which a counterweight is fastened near the second extremity of said pivotal member to neutralize the acceleration effects due primarily to said grip.

6. Apparatus of the character as described in claim 4 in which the coupling between the first pick-off element and said pivotal member is arranged so that the second extremity of said pivotal member must move a predetermined distance before the first pick-off element is moved.

7. Apparatus of the character as described in claim 6 in which at least one switch is cooperatively disposed with respect to the second extremity of said pivotal member for actuation by movement of said second extremity.

8. A stick controller comprising a housing, a spherical bearing mounted within a first extremity of said housing, a pivot member slidably mounted within said bearing for universal movement about the center of said spherical bearing, said pivot member being substantially coaxial with the longitudinal axis of said housing, a manual grip member fastened to a first extremity of said pivot member, a sesilient tubular member yieldingly connected near the first extremity of said housing and near the second extremity of said pivot member, said resilient tubular member being substantially coaxial with the longitudinal axis of said housing and disposed within said housing and exteriorly of said pivot member, a counterweight fastened near the second extremity of said pivot member and disposed to cooperate with said housing thereby acting as a stop member and a pick-off means responsive to the force applied to said grip member for supplying an electrical signal in accordance with the direction and magnitude of said applied force wherein the stator of said pick-off is fastened to said housing and disposed to cooperate with an armature mounted on the second extremity of said pivot member.

9. A stick controller of the character described in claim 8 wherein said pivot member is of hollow tubular construction having apertures therein near the second extremity thereof for providing a passage for electrical leads therethrough.

10. A control stick transducer for use with automatic pilot systems for mobile craft comprising a control stick, a tubular hollow housing connected to one extremity of said control stick, a hollow tubular pivot member coaxially disposed within said housing; a first extremity of said pivot member being adapted to receive a grip member, a spherical bearing disposed between said housing and said pivot member for slidably and universally mounting said pivot member; said bearing being disposed within and near the first extremity of said housing, a first resilient member coaxially disposed intermediate said housing and said pivot member and yieldingly coupling said housing and said pivot member, a counterweight fastened near a second extremity of said pivot member and adapted to provide a counter balance for said grip member; said counterweight being disposed for contacting said housing upon the application of a predetermined force to said grip member, a bidirectional pick-off means responsive to the force applied to said grip member for providing a signal in accordance with the magnitude and direction of the applied force, wherein the stator is mounted on a support coaxially disposed with respect to the longitudinal axis of said housing and the armature thereof is cooperative with the stator and mounted to move in accordance with the movement of said pivot member.

11. A stick controller of the character described in claim 10 including apertures providing a conduit through said pivot member and said pick-off support.

12. A stick controller of the character described in claim 10 including a second resilient member coaxially mounted within said housing having a first extremity thereof connected to said housing; the second extremity thereof having said armature attached thereto and positionable in accordance with the movement of said pivot member, a plurality of switches radially disposed within said housing with respect to the longitudinal axis thereof, said second extremity of said pivot member being adapted to cooperate with at least one of said switches upon the application of a force to said grip member whereby the switches are actuated upon the application of a predetermined force to said grip member for connecting the output of said pick-off to said automatic pilot system.

13. A stick controller of the character described in claim 12 wherein said second resilient member has an appreciably higher spring constant than said first resilient member.

14. A stick controller of the character described in claim 12 wherein said stator elements and said switches are adjustable for alignment with respect to each other.

References Cited in the file of this patent
UNITED STATES PATENTS

| | | |
|---|---|---|
| 2,408,770 | Frische et al. | Oct. 6, 1946 |
| 2,512,902 | Rossire | June 27, 1950 |
| 2,737,624 | Muller | Mar. 6, 1956 |
| 2,790,119 | Konet et al. | Apr. 23, 1957 |